US011339856B2

(12) United States Patent
Kabai et al.

(10) Patent No.: US 11,339,856 B2
(45) Date of Patent: May 24, 2022

(54) POWER TRANSMISSION DRIVE FOR ROBOTIC APPLICATIONS

(71) Applicant: ELEV8.design Inc., Hayward, CA (US)

(72) Inventors: Attila Aurel Kabai, Hayward, CA (US); George Babu, Palo Alto, CA (US); Samuel Zlibut, Citrus Heights, CA (US)

(73) Assignee: ELEV8.design Inc., Hayward, CA (US)

( * ) Notice: Subject to any disclaimer, the term of this patent is extended or adjusted under 35 U.S.C. 154(b) by 44 days.

(21) Appl. No.: 17/076,533

(22) Filed: Oct. 21, 2020

(65) Prior Publication Data

US 2021/0116006 A1 Apr. 22, 2021

Related U.S. Application Data

(60) Provisional application No. 62/924,451, filed on Oct. 22, 2019.

(51) Int. Cl.
| | |
|---|---|
| *F16H 27/02* | (2006.01) |
| *F16H 29/02* | (2006.01) |
| *F16H 19/00* | (2006.01) |
| *B25J 9/10* | (2006.01) |
| *F16H 19/08* | (2006.01) |

(52) U.S. Cl.
CPC ............ *F16H 19/005* (2013.01); *B25J 9/104* (2013.01); *F16H 2019/085* (2013.01)

(58) Field of Classification Search
CPC ....... B25J 9/1045; B25J 9/104; F16H 19/005; F16H 2019/085
See application file for complete search history.

(56) References Cited

U.S. PATENT DOCUMENTS

| | | | |
|---|---|---|---|
| 4,013,028 A | 3/1977 | Murakami | |
| 4,903,536 A * | 2/1990 | Salisbury, Jr. | ............ B25J 9/046 414/7 |
| 5,046,375 A * | 9/1991 | Salisbury, Jr. | ......... B25J 9/1045 74/89.22 |
| 5,207,114 A | 5/1993 | Salisbury et al. | |
| 10,018,256 B1 | 7/2018 | Magnusson et al. | |
| 10,330,182 B2 * | 6/2019 | Edsinger | ................. F16H 19/08 |
| 2013/0090194 A1 | 4/2013 | Ferlay et al. | |
| 2017/0067547 A1 | 3/2017 | Edsinger et al. | |
| 2019/0375115 A1 * | 12/2019 | Yamaguchi | ............ A61B 1/018 |

OTHER PUBLICATIONS

PCT International Search Report and Written Opinion, PCT Application No. PCT/US2020/056685, dated Jan. 21, 2021, 12 pages.

* cited by examiner

*Primary Examiner* — Jake Cook
(74) *Attorney, Agent, or Firm* — Fenwick & West LLP

(57) ABSTRACT

A power transmission drive includes a force amplifier configured to increase power output of at least one motor. The force amplifier includes a first pulley set and a second pulley set, each pulley set including at least one floating pulley and at least one fixed pulley. The first pulley set and the second pulley set are coupled to one or more motors by a corresponding force amplification fiber in tension. Actuation of the one or more motors actuate the first pulley set and the second pulley set. The first pulley set and the second pulley set transmit the force applied by the one or more motors to an output component.

20 Claims, 9 Drawing Sheets

POWER TRANSMISSION DRIVE FOR ROBOTIC APPLICATIONS

CROSS REFERENCE TO RELATED APPLICATIONS

This application claims the benefit of U.S. Provisional Application No. 62/924,451, filed Oct. 22, 2019, which is incorporated by reference in its entirety.

BACKGROUND

The present disclosure generally relates to power transmission drives, and specifically to power transmission drives for robotic applications.

Generally, power transmission drives transmit power from an input shaft to an output shaft using mechanical components. Power transmission drives are often used to increase torque or speed of a mechanical system for a given input power. Existing power transmission drives such as helical gear drives, planetary gear drives, belt drives, or chain drives, however, are not well suited to robotic applications. These types of systems can be bulky, heavy, and have high backlash. Furthermore, some of these systems have low precision and low output power. Accordingly, a power transmission drive suited to robotic applications is needed.

SUMMARY

Embodiments relate to a power transmission drive for mechanical applications, e.g., robotic applications. The power transmission drive includes a force amplifier configured to amplify force received from one or more motors. The force amplifier includes a first pulley set and a second pulley set, and each pulley set comprises at least one fixed pulley and at least one floating pulley. The force amplifier further includes a first force amplification fiber in tension that couples (e.g., in contact with and wraps at least partially around) the at least one fixed pulley to the at least one floating pulley of the first pulley set. The force amplifier further includes a second force amplification fiber in tension that couples the at least one fixed pulley to the at least one floating pulley of the second pulley set. The power transmission drive further includes a motor assembly including a first motor coupled to the first force amplification fiber of the first pulley set. The motor assembly further includes a second motor coupled to the second force amplification fiber of the second pulley set. The first pulley set and the second pulley set can be actuated independently by the first and second motors. Furthermore, the first pulley set and the second pulley set may be an antagonistic pair. The power transmission drive further includes a first output fiber coupled to the at least one floating pulley of the first pulley set. The power transmission drive further includes a second output fiber coupled to the at least one floating pulley of the second pulley set.

The output fibers can be coupled to an output component by an output pulley such that power is transmitted from the motors to the output component by the force amplifier. The force amplifier increases power to the output component while reducing backlash. In some embodiments, the power transmission drive is included in a robotic system (e.g., a robotic arm, a robotic leg, an exoskeleton, etc.).

Some embodiments relate to a power transmission drive for mechanical applications that includes a force amplifier configured to amplify force received from a motor. The force amplifier includes a first pulley set and a second pulley set, and each pulley set comprises at least one fixed pulley and at least one floating pulley. The force amplifier further includes a first force amplification fiber in tension that couples the at least one fixed pulley to the at least one floating pulley of the first pulley set. The force amplifier further includes a second force amplification fiber in tension that couples the at least one fixed pulley to the at least one floating pulley of the second pulley set. In some embodiments, a first end of the first force amplification fiber of the first pulley set is fixed to a damping element and a first end of the second force amplification fiber of the second pulley is fixed to the damping element. The power transmission drive further includes the motor coupled to the first force amplification fiber of the first pulley set and the second force amplification fiber of the second pulley set. The power transmission drive further includes a first output fiber coupled to the at least one floating pulley of the first pulley set and a second output fiber coupled to the at least one floating pulley of the second pulley set.

The output fibers can be coupled to an output component by an output pulley such that power is transmitted from the motor to the output component by the force amplifier. The force amplifier increases power to the output component while reducing backlash. In some embodiments, the power transmission drive is included in a robotic system.

Some embodiments relate to a method for amplifying force using a power transmission drive. The method includes actuating a first motor coupled to a first force amplification fiber of a first pulley set. The first pulley set comprises at least one fixed pulley and at least one floating pulley. The at least one fixed pulley is coupled to the at least one floating pulley by the first force amplification fiber of the first pulley set in tension. In response to actuation of the first motor, the first pulley set applies an amplified force to an output pulley. The amplified force is greater than an input force from the first motor. In response to the application of the amplified force, the output pulley enables motion for a robotic system. The method further includes actuating a second motor coupled to a second force amplification fiber of a second pulley set. The second pulley set comprises at least one fixed pulley and at least one floating pulley. The at least one fixed pulley is coupled to the at least one floating pulley by the second force amplification fiber of the second pulley set in tension. In response to actuation of the second motor, the second pulley set applies an amplified force to the output pulley. The amplified force is greater than an input force from the second motor. In response to the application of the amplified force, the output pulley enables motion for a robotic system.

Some embodiments relate to a method for amplifying force using a power transmission drive. The method includes actuating a motor coupled to a first force amplification fiber of a first pulley set and a second force amplification fiber of a second pulley set. The first pulley set comprises at least one fixed pulley and at least one floating pulley. The at least one fixed pulley is coupled to the at least one floating pulley by the first force amplification fiber of the first pulley set in tension. The second pulley set comprises at least one fixed pulley and at least one floating pulley. The at least one fixed pulley is coupled to the at least one floating pulley by the second force amplification fiber of the second pulley set in tension. In response to actuation of the motor, the first pulley set applies an amplified force to an output pulley and, by the second pulley set, an amplified force to the output pulley. The amplified force is greater than an input force from the motor. In response to the application of the amplified force, the output pulley enables motion for a robotic system.

Figure 1A:
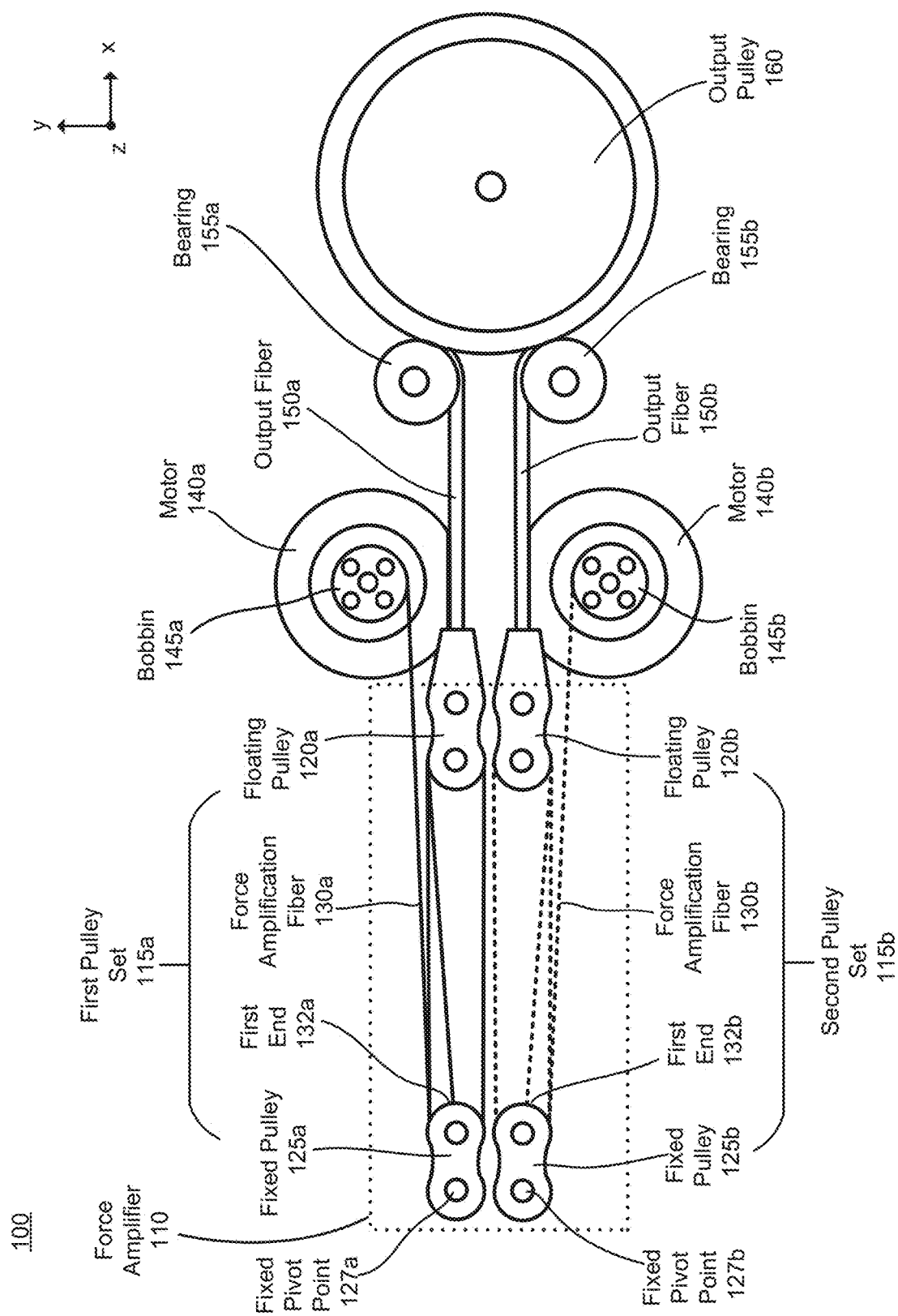
FIG. 1A is a side view of an example power transmission drive, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Many mechanical systems use power transmission drives to increase the torque or speed output of the system. Existing power transmission drives, however, are not well suited to robotic applications. Current systems such as pneumatic or hydraulic systems, gear trains, belt drives, and chain drives can be costly, complex and heavy. Additionally, some types of power transmission drives have short service lives, low precision, and low torque or speed output. As such, a power transmission drive with low backlash and high torque or speed output suited to robotic applications is needed.

The disclosed example embodiments include a power transmission drive configured to change torque or speed output of one or more motors. The power transmission drive includes a force amplifier configured to adjust the torque or speed output based on the input power. The force amplifier includes a first pulley set and a second pulley set. The first pulley set and the second pulley set each include at least one floating pulley and at least one fixed pulley. A first force amplification fiber in tension couples (e.g., in contact with and wraps at least partially around) the at least one fixed pulley and the at least one floating pulley of the first pulley set. A second force amplification fiber in tension couples the at least one floating pulley and at least one fixed pulley of the second pulley set. In some embodiment, the first force amplification fiber may couple to a first motor and the second force amplification fiber may couple to a second motor, such that the first pulley set and the second pulley set can be independently actuated. The first pulley set and the second pulley set can be an antagonistic pair. In some embodiments, the first force amplification fiber and the second force amplification fiber may couple to a motor, such that the first pulley set and the second pulley set can be actuated simultaneously. A first output fiber is coupled to the at least one floating pulley of the first pulley set. A second output fiber is coupled to the at least one floating pulley of the second pulley set. The output fibers may be coupled to an output component by an output pulley. As such, in some embodiments, the force of the first motor and/or the second motor is amplified by the force amplifier, and the output power is increased at the output pulley. And, in other embodiments, the force of the motor is amplified by the force amplifier, and the output power is increased at the output pulley. In some embodiments, the power transmission drive may be included in a robotic arm.

The components of the power transmission drive operate in tension to amplify the force of the one or more motors. This allows the one or more motors to provide relatively high input speeds with minimal inertia and backlash on the system components. Additionally, the rolling contact between the pulleys and the force amplification fiber allows for improved efficiency of the power transmission drive. The power transmission drive is lightweight, robust, and compact such that the power transmission drive is well suited to robotic applications. Embodiments of the power transmission drive are described in greater detail below.

Example embodiments also include a method for amplifying force using the power transmission drive. The method includes actuating a first motor coupled to a first force amplification fiber of a first pulley set. The first pulley set comprises at least one fixed pulley and at least one floating pulley. The at least one fixed pulley is coupled to the at least one floating pulley by the first force amplification fiber of the first pulley set in tension. In response to actuation of the first motor, the first pulley set applies an amplified force to an output pulley. The amplified force is greater than an input force from the first motor. In response to the application of the amplified force, the output pulley enables (or provides) motion for a robotic system. The method further includes actuating a second motor coupled to a second force amplification fiber of a second pulley set. The second pulley set comprises at least one fixed pulley and at least one floating pulley. The at least one fixed pulley is coupled to the at least one floating pulley by the second force amplification fiber of the second pulley set in tension. In response to actuation of the second motor, the second pulley set applies an amplified force to the output pulley. The amplified force is greater than an input force from the second motor. In response to the application of the amplified force, the output pulley enables (or provides) motion for a robotic system.

Example embodiments also include a method for amplifying force using a power transmission drive with one motor. The method includes actuating a motor coupled to a first force amplification fiber of a first pulley set and a second force amplification fiber of a second pulley set. The first pulley set comprises at least one fixed pulley and at least one floating pulley. The at least one fixed pulley is coupled to the at least one floating pulley by the first force amplification fiber of the first pulley set in tension. The second pulley set comprises at least one fixed pulley and at least one floating pulley. The at least one fixed pulley is coupled to the at least one floating pulley by the second force amplification fiber of the second pulley set in tension. In response to actuation of the motor, the first pulley set applies an amplified force to an output pulley and, by the second pulley set, an amplified force to the output pulley. The amplified force is greater than an input force from the motor. In response to the application of the amplified force, the output pulley enables (or provides) motion for a robotic system.

System Configuration

Figure (FIG. 1A illustrates a schematic of an example power transmission drive, in accordance with one or more embodiments. The example power transmission drive 100 includes at least one force amplifier 110, one or more motors 140, one or more bobbins 145, one or more output fibers 150, one or more bearings 155, and at least one output pulley 160. In other embodiments, the power transmission drive 100 includes fewer or greater components than described herein. Additionally, the functions of the components may be distributed in a different manner than described below.

The force amplifier 110 is configured to adjust power transmitted from one or more motors (e.g., 140a, 140b) (or an input drive source) to an output component. The force amplifier 110 is configured to increase output torque of one or more motors without applying extreme load to components of the power transmission drive 100. In some embodiments, a motor applies a torque to the force amplifier 110, and the force amplifier 110 adjusts the output torque according to the speed of the motor.

The force amplifier 110 includes a first pulley set 115a and a second pulley set 115b. The first pulley set 115a is described below for illustrative purposes. The second pulley set 115b is substantially the same as the first pulley set 115a. The first pulley set 115a includes at least one floating pulley 120a and at least one fixed pulley 125a. In some embodiments, the first pulley set 115a includes a plurality of floating pulleys 120a and fixed pulleys 125a, described below in relation to FIG. 1B. The fixed pulley 125a is fixed about a pivot point 127a such that the fixed pulley 125a is stationary. In the embodiment shown in FIG. 1A, the fixed pulley 125a and the floating pulley 120a are aligned along an axis parallel to the x-axis. In other embodiments, the floating pulley 120a is offset from the fixed pulley 125a along an axis parallel to the x-axis. In one embodiment, the floating pulley 120a is configured to translate in the positive and negative x-direction responsive to actuation of a motor 140a.

Alternatively, the floating pulley 120a may be configured to move along a different axis (e.g., the y-axis), along a combination of axes (e.g., a portion along the x-axis and a portion along the y-axis), or along a non-linear path (e.g., the floating pulley 120a travels along a path intended to navigate the floating pulley 120a around one or more other components of the power transmission drive 100). The floating pulley 120a is coupled to the fixed pulley 125a by a force amplification fiber 130a, described in greater detail below. The range of motion of the floating pulley 120a may be varied by changing the length of the force amplification fiber 130a and/or the output fiber 150a, by changing the size of the bobbin 145a, the bearing 155a, and/or the output pulley 160, or any combination thereof. The desired degree of force amplification may be achieved by varying the length of the force amplification fiber 130a, the size of the bobbin 145a, the number of windings of the force amplification fiber 130a around the fixed pulley 125a and the floating pulley 120a, or any combination thereof. For example, in some embodiments, a greater number of windings of the force amplification fiber 130a around the fixed pulley 125a and the floating pulley 120a increases the torque output at the output pulley 160 relative to the torque input to the force amplifier 110 by the motor 140a.

In the embodiment of FIG. 1A, the floating pulley 120a and the fixed pulley 125a are approximately the same size and shape. In other embodiments, the pulleys may have a unique size and/or shape. The floating pulley 120a and the fixed pulley 125a are rounded on at least one side, the at least one side configured to contact the force amplification fiber 130a. The floating pulley 120a and the fixed pulley 125a may be composed of a strong and lightweight material for supporting the force amplification fiber 130a. For example, the pulleys may be composed of one or more (e.g., hybrid of) plastic, aluminum, steel, copper, ceramic, or any other suitable material. Additionally, the floating pulley 120a and/or the fixed pulley 125a can be composed of a material with a low coefficient of friction or have a surface treatment (e.g., polish, lubrication) for reducing friction between the pulleys and the force amplification fiber 130a.

The force amplification fiber 130a wraps around the fixed pulley 125a and the floating pulley 120a. A first end 132a of the force amplification fiber 130a is attached to the fixed pulley 125a such that the force amplification fiber 130a is fixed at the first end 132a. The first end 132a of the force amplification fiber 130a may be attached at the fixed pivot point 127a or at any other suitable location on the fixed pulley 125a. The force amplification fiber 130a is routed from the fixed end to the floating pulley 120a. The force amplification fiber 130a wraps around the floating pulley 120a and is routed back to the fixed pulley 125a. The force amplification fiber 130a is wrapped around the floating pulley 120a and the fixed pulley 125a in an alternating fashion one or more times as needed in order to achieve the desired degree of force amplification. The force amplification fiber 130a wraps around the fixed pulley 125a and is routed from the fixed pulley 125a to a bobbin 145a, and the bobbin 145a is coupled to the motor 140a. The force amplification fiber 130a is configured such that the power transmission drive 100 relies on tension rather than friction to drive motion. This configuration allows the power transmission drive 100 to sustain large input forces from a motor with minimal backlash.

The force amplification fiber 130a may be composed of a strong and durable material. For example, the force amplification fiber 130a can be composed of ultra-high molecular weight polyethylene. Additionally, the force amplification fiber 130a may be composed of a material with a low coefficient of friction, such that friction between the force amplification fiber 130a and the pulleys is minimized. Alternatively, or additionally, the force amplification fiber 130a can have a surface finish or applied lubrication to reduce friction between the force amplification fiber 130a and the pulleys. In other embodiments, the force amplification fiber 130a can be composed of any suitable material (e.g., steel, aluminum).

In the embodiment of FIG. 1A, the first pulley set 115a is driven by a motor 140a coupled to a bobbin 145a. As described above, the force amplification fiber 130a is routed from the fixed pulley 125a to the bobbin 145a. In the embodiment of FIG. 1A, the force amplification fiber 130a wraps around the bobbin 145a, and the motor 140a actuates rotation of the bobbin 145a. Rotation of the bobbin 145a causes translation of the floating pulley 120a towards the fixed pulley 125a or away from the fixed pulley 125a along an axis parallel to the x-axis. In other embodiments, the motor 140a can be coupled to a different component (e.g., rod, shaft, gear train). In alternative embodiments, the first pulley set 115a may be driven by a different type of actuating system (e.g., pneumatic actuator, hydraulic actuator, etc.)

The first pulley set 115a is coupled to an output fiber 150a configured to interact with an output component. In some embodiments, the output fiber 150a is configured to translate with the floating pulley 120a along an axis parallel to the x-axis, as described above. In one embodiment, the floating pulley 120a is coupled to the output fiber 150a, and the output fiber 150a is routed to an output pulley 160 via a bearing 155a. The bearing 155a is configured to constrain motion of the output fiber 150a relative to the output pulley 160. The bearing 155a has a fixed position. The bearing 155a may be a plain bearing, a ball bearing, a roller bearing, a fluid bearing, or any other suitable type of bearing.

The output fiber 150a may be a single fiber composed of a strong and durable material such as a metal (e.g., steel, aluminum, copper, etc.). In other embodiments, the output fiber 150a may be an elastic material (e.g., rubber or elastic polymer) such that the output fiber 150a can absorb shock and reduce backlash of the power transmission drive 100. In the embodiment of FIG. 1A, the power transmission drive 100 includes an output fiber corresponding to each pulley set 115a and 115b. In other embodiments, the power transmission drive 100 may include a single output fiber coupled to both pulley sets 115a and 115b.

The output fiber 150a applies a torque to the output pulley 160. In one embodiment, the output pulley 160 has a fixed position (e.g., the output pulley 160 is fixed about its center point). Additionally, the output pulley 160 can have a shaft coupled to its center point, such that the applied torque is also applied to the shaft. The shaft may be connected to a component of another system (e.g., a robotic component). In some embodiments, the output pulley 160 can be replaced with non-linear or eccentric cams or a kinematic linkage assembly. In this embodiment, the power transmission drive 100 may have improved control and/or customization of the force amplification along the range of motion of the system connected to the output. For instance, for applications where different amounts of torque at different points in the range of motion are necessary, the output pulley 160 may be shaped like a cam. When the power transmission drive 100 is used in a robotic arm application, the output pulley 160 shaped like a cam may be used to counteract natural points in the trajectory of the robotic arm where there is reduced output torque or may be used to provide different torque and/or speed characteristics at different points in the trajectory of the arm.

The output pulley 160 can have a diameter greater than the diameter of the bobbin 145a. Additionally, the output pulley 160 may be composed of a strong and lightweight material for providing support to the output fiber 150a. For example, the output pulley 160 may be composed of aluminum, steel or copper. The output pulley 160 may also be composed of a material with a low coefficient of friction, have a surface finish, or applied lubrication for reducing friction between the output fiber 150a and the output pulley 160. In some embodiments, the output torque exerted on the pulley may be determined by a ratio of the radius of the output pulley 160 to the radius of the bobbin 145a. For instance, the output torque exerted on the pulley is proportional to the number of output fibers (i.e., the number of floating pulleys in the system multiplied by two) multiplied by the ratio of the radius of the output pulley 160 to the radius of the bobbin 145a seen in the following equation:

$$\tau 2 = (P_{fl} * 2)\left(\frac{R_2}{R_1}\right)\tau 1 \qquad (1)$$

where $\tau 2$ is the output torque, $P_{fl}$ is the number of floating pulleys in the system, $R_2$ is the radius of the output pulley, $R_1$ is the radius of the bobbin, and $\tau_1$ is the input torque applied by the motor. Consider a power transmission drive with ten floating pulleys and a 5:1 ratio of the radius of the output pulley to the radius of the bobbin. The output torque would by 100 times greater than the input torque (i.e., $\tau 2=(10*2)(5) \tau 1=100 \tau 1$).

The first pulley set 115a is described above for illustrative purposes. The second pulley set 115b may be substantially the same in structural characteristics as the first pulley set 115a. In some embodiments, the second pulley set 115b is designed to have a greater or lesser degree of force amplification than the first pulley set 115a. The second pulley set 115b is positioned below the first pulley set 115a along an axis parallel to the y-axis such that the fixed pulley 125b is aligned with the fixed pulley 125a and the floating pulley 120b is aligned with the floating pulley 120a. In other embodiments, the second pulley set 115b can be positioned in a different location (e.g., offset) relative to the first pulley set 115a. Similar to the first pulley set 115a, the second pulley set 115b is coupled to a bobbin 145b and an output fiber 150b. The bobbin 145b is coupled to a motor 140b. The motor 140b and the bobbin 145b are substantially the same as the motor 140a and the bobbin 145a. In some embodiments, the first pulley set 115a and the second pulley set 115b may have different gear ratios. With different gear ratios, when the power transmission drive 100 is placed in a robotic arm, the arm may be stronger in one direction (e.g., a lifting direction) and may be faster in a different direction (e.g., a return direction).

The output fiber 150b is substantially the same as output fiber 150a. Like the output fiber 150a, the output fiber 150b is also coupled to the output pulley 160 by a bearing 155b. In some embodiments, the power transmission drive 100 includes only one bearing. In this embodiment, the output fiber 150a and the output fiber 150b are both coupled to the output pulley 160 by a single bearing. The output fiber 150b is configured to apply a torque amplified by the second pulley set 115b. The output fiber 150b is constrained by the fixed bearing 155b. The fixed bearing 155b is substantially aligned with the bearing 155a along an axis parallel to the y-axis. The output fiber 150b is positioned so that it does not interfere with the output fiber 150a. The configuration of the first pulley set 115a and the second pulley set 115b with corresponding output fibers 150a and 150b allows for independent and precise control of each pulley set 115. For example, the motor 140a can be actuated independently from the motor 140*b*, actuating either the first pulley set 115*a* or the second pulley set 115*b*.

Figure 1B:
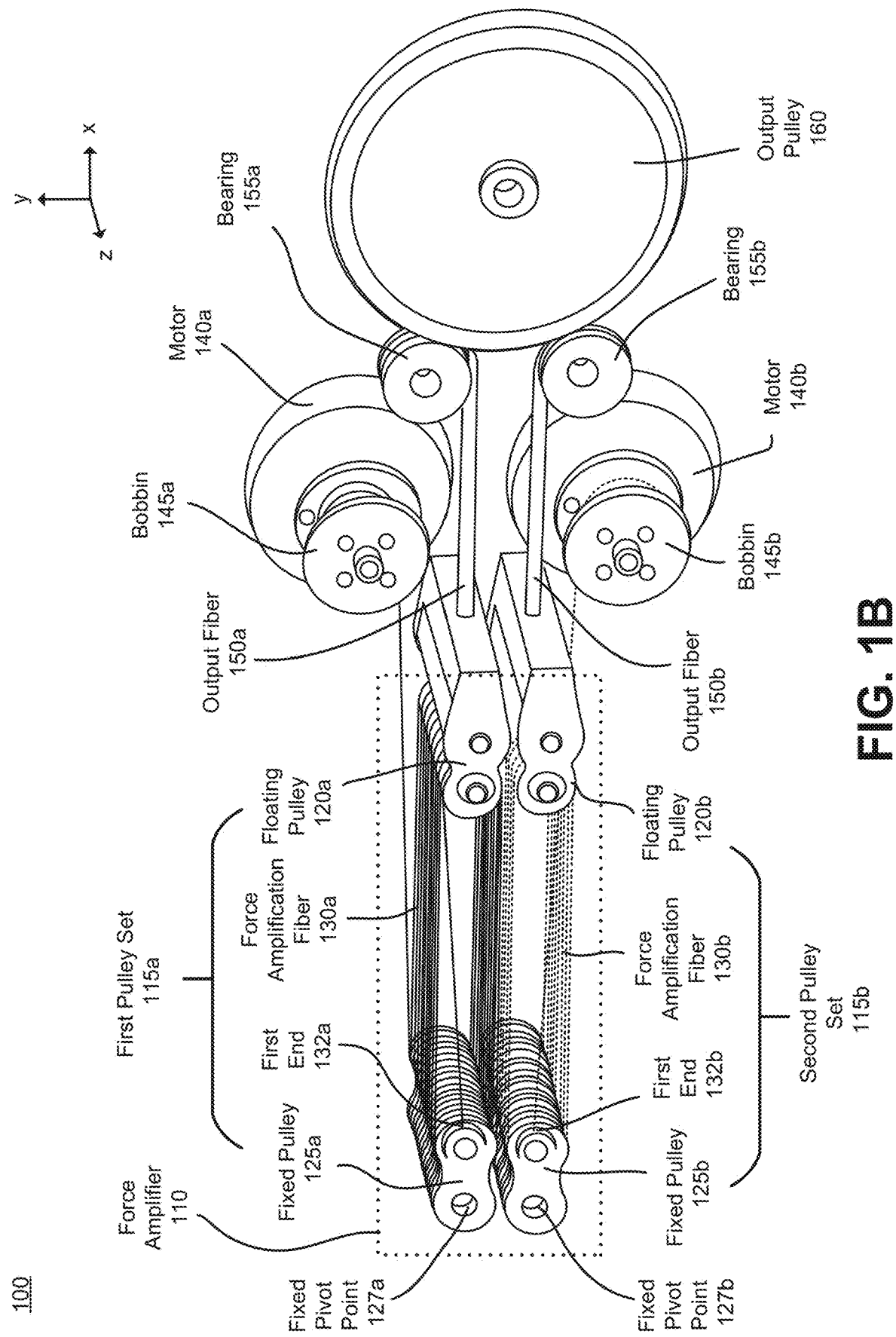
FIG. 1B is an isometric view of the example power transmission drive shown in FIG. 1A.

In some embodiments, the first pulley set 115*a* and the second pulley set 115*b* can each include a plurality of fixed pulleys 125 and floating pulleys 120 for amplifying force from one or more motors 140. FIG. 1B illustrates an isometric view of the power transmission drive 100 illustrated in FIG. 1A, in accordance with an embodiment. In the embodiment of FIG. 1B, each pulley set 115 includes a plurality of floating pulleys 120 and fixed pulleys 125. The floating pulleys 120 and the fixed pulleys 125 of the pulley sets 115 are each stacked along an axis parallel to the z-axis such that the configuration of the pulleys is compact. The force amplification fibers 130*a* and 130*b* are wrapped around each pulley included in the respective pulley set 115*a* and 115*b*.

The plurality of floating pulleys 120*a* in the first pulley set 115*a* are collectively coupled to the output fiber 150*a*. Likewise, the plurality of floating pulleys 120*b* in the second pulley set 115*b* are coupled to the output fiber 150*b*. As described above, the first motor 140*a* and/or the second motor 140*b* applies a torque to a respective bobbin 145*a* or 145*b* to which it is coupled. The torque causes rotation of the respective bobbin 145*a* or 145*b*, and rotation of the bobbin 145*a* and/or 145*b* actuates the force amplifier 110. In the embodiment of FIG. 1B, the output torque exerted on the output pulley 160 is proportional to the total number of floating pulleys 120 included in both the first pulley set 115*a* and the second pulley set 115*b*. The configuration of pulleys allows for an increased torque output while minimizing backlash.

The power transmission drive 100 may include additional components not described herein. For example, the power transmission drive 100 can include damping or spring elements to further control the dynamic response of components of the power transmission drive 100. In some embodiments, damping may be controlled in near real-time using an electronic dashpot element. The power transmission drive 100 also may include control cables or mechanical linkages for coupling components of the power transmission drive 100. For example, the force amplifier 110 may be located in a position separate from the output pulley 160, and the force amplifier 110 may be coupled to the output pulley 160 by a control cable. In some embodiments, the center of gravity of the motor(s) can be decoupled from the location of the force amplifier 110 by using additional cables or linkages.

The power transmission drive 100 described above in relation to FIGS. 1A-1B is a tension power transmission drive (e.g., the force amplification fibers 130*a* and 130*b* and the output fibers 150*a* and 150*b* are in constant tension) such that the power transmission drive 100 does not rely on friction to drive motion. The tension configuration allows the power transmission drive 100 to have a low backlash and high output power. By pre-tensioning the force amplifier 110, energy is built up in the force amplifier 110 and allows the motor 140*a* and the motor 140*b* to provide impulse forces and torques greater than the maximum torques the motors 140*a*, 140*b* would be able to provide in steady state. The antagonistic pair (i.e., the first pulley set 115*a* and the second pulley set 115*b*) may begin accelerating and building up energy. The tension settings may be based on received instructions from a control system. In one embodiment, the control system may be a component included in the power transmission drive 100 system. In some embodiments, the control system may be an external component connected via a wired or wireless connection to the power transmission drive 100. The power transmission drive 100 or some portion thereof (e.g., the force amplifier 110) can be included in a robotics system, for example, a robotic arm or leg. In a specific example, the force amplifier 110 is an antagonistic set of muscles in a robotic arm (e.g., biceps and triceps) and allows the robotic arm to lift objects. In other embodiments, one or more components of the power transmission drive 100 can be included in any type of robotic or mechanical actuating system.

Depending on the particular application of the power transmission drive 100 several important criteria are considered in the design of the power transmission drive 100 and its various components. The criteria affect a reduction ratio of the power transmission drive 100 seen in the following equation:

$$RR = (P_{fl} * 2)\left(\frac{R_2}{R_1}\right) \qquad (2)$$

where RR is the reduction ratio, $P_{fl}$ is the number of floating pulleys in the system, $R_2$ is the radius of the output pulley, and $R_1$ is the radius of the bobbin. This equation ignores any force amplification fiber 130 or output fiber 150 stretch. The criteria to consider may include inertia matching, load capacity, stiffness, longevity, physical size, and efficiency.

For example, in a high-speed robotic application where stability and optimal power transfer (from input to output) is important, the following criteria are considered. First, the reduction ratio RR should be substantially equal to the ratio of output inertia (or output torque τ2) to input inertia (or input torque τ1). In practice, reduction ratios may top out at approximately 60:1. For such a large discrepancy between the input inertia and the output inertia, a single-stage cable drive may be incorporated into the power transmission drive 100 to drive the bobbins 145. For inertia matching, the following equation:

$$I_{out} \approx RR * I_{in} \qquad (3)$$

where $I_{out}$ is the output inertia and $I_{in}$ is the input inertia may be used. The input inertia $I_{in}$ is determined with the following equation:

$$I_{in} = I_M + \Sigma_{i=1}^{P} I_{IP} + I_{OP} + I_F \qquad (4)$$

where $I_M$ is the motor inertia, $\Sigma I_{IP}$ is the summation of inertia of the pulleys, Top is the output pulley inertia, and $I_F$ is the force amplification fiber and output fiber inertia. For a first order approximation, the motor inertia $I_M$ dominates the input inertia $I_{in}$. Thus, the inertia matching equation (3) becomes the following:

$$I_{out} = RR * I_M \qquad (5)$$

and if using a single-stage cable drive the inertia matching equation becomes:

$$I_{out} = RR_C * RR_{SS} * I_M \qquad (6)$$

where $RR_C$ is the reduction ration of the cable and $RR_{SS}$ is the reduction ration of the single-stage.

Once the reduction ratio is determined, load capacities are considered. For load capacities, continuous, peak, and ultimate loads are determined for the power transmission drive 100. The material, size, and minimum bending radii of the force amplification fibers 130 and the output fibers 150 may be based on the determined load capacities. The sizes (e.g., the radii) of the floating pulleys 120, fixed pulleys 125, and output pulley 160 may be determined based on expected load types (e.g., impact, smoothness, acceleration, and so on) and the calculated ultimate loads. The lifetime of the pulleys may be reduced if the load type is extreme, such as impact loading, high acceleration, and/or fretting motion. The pulley sizes may be increased relative to the types of load the pulleys are subjected to.

For maximizing stiffness (e.g., joint stiffness), the stiffness of the force amplification fibers 130 and the stiffness of the output fibers 150 may be matched by matching the strain of the force amplification fibers 130 and the strain of the output fibers 150. To match the strains, the strain of the output fibers 150 should be substantially the same as the strain of the force amplification fibers 130 divided by the force amplifier ratio (i.e., 2 times the number of floating pulleys 120). With some fibers being of a complex winding of single filaments, the stress and/or strain properties of the fibers may be empirically determined. In some embodiments, a recursive application of the above techniques may be required to determine (e.g., inertia matching, load capacities, stiffness, etc.).

To maximize longevity of the power transmission drive 100, the stiffness of the output component may be balanced against a desired mean time before failure (MTBF). The force amplification fibers 130 and the output fibers 150 may operate at low internal stresses (e.g., not to exceed 10% of their yield maximum, not to exceed 15% of their yield maximum, etc.). In one example, metallic force amplification fibers 130 and/or output fibers 150 (e.g., stainless steel fibers) may operate near their infinite fatigue resistance. In another example, force amplification fibers 130 and/or output fibers 150 made from high-performance materials, such as ultra-high molecular weight polyethylene, there is no infinite fatigue resistance and their performance may be weighed against their limited lifetimes, high wear rates, and the subsequent reduction in performance over time.

Figure 2:
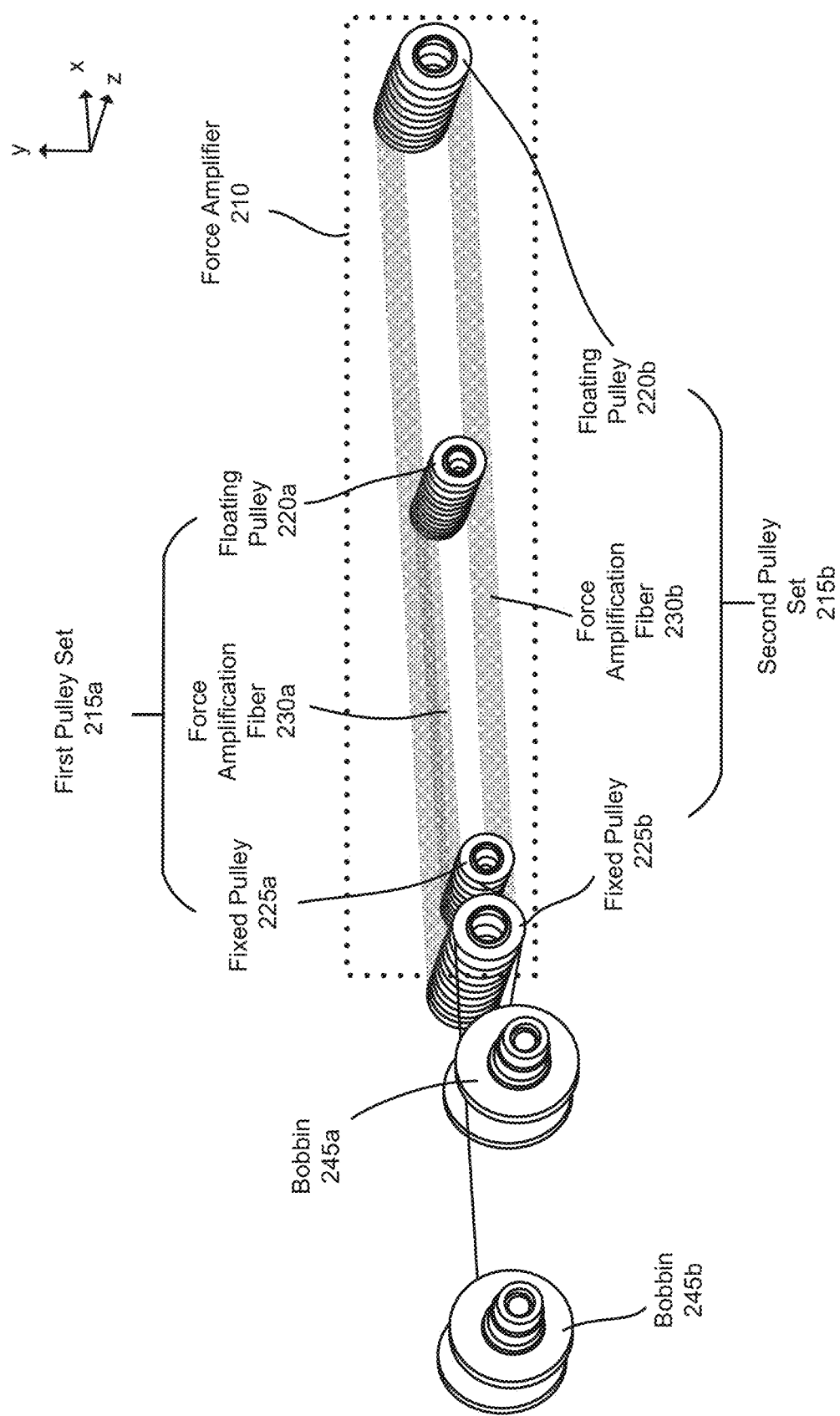
FIG. 2 illustrates an alternative embodiment of an example force amplifier, in accordance with one or more embodiments.

In one embodiment, the force amplifier 110 is designed as singular, replaceable component. FIG. 2 illustrates a second embodiment of an example force amplifier 210, in accordance with an embodiment. The force amplifier 210 is configured to increase power output of one or more motors. The force amplifier 210 described below can have fewer or greater components for increasing power output of a system. Additionally, the functions of the components of the force amplifier 210 can be different than described below.

Similar to force amplifier 110, the force amplifier 210 includes a first pulley set 215a and a second pulley set 215b. The first pulley set 215a includes a floating pulley 220a and a fixed pulley 225a. As shown in FIG. 2, the first pulley set 215a includes a plurality of fixed pulleys 225a and a plurality of floating pulleys 220a. Each of the plurality of pulleys (fixed pulleys 225a and floating pulleys 220a) are stacked along an axis parallel to the z-axis, as shown in FIG. 2, so that the pulleys are compact. The floating pulleys 220a and the fixed pulleys 225a are aligned along an axis parallel to the x-axis such that the force amplification fiber 230a is parallel to the x-axis. In the embodiment of FIG. 2, the floating pulleys 220a and the fixed pulleys 225a are substantially the same size and shape (e.g., they have the same diameter). In alternative embodiments, the floating pulleys 220a and the fixed pulleys 225a can have different shapes and/or sizes.

The force amplification fiber 230a is configured to wrap around the fixed pulleys 225a and the floating pulleys 220a. In one embodiment, a first end of the force amplification fiber 230a is coupled to a fixed pulley 225a such that the force amplification fiber 230a is fixed at the first end. The force amplification fiber 230a is routed from the fixed end to wrap around a floating pulley 220a. The force amplification fiber 230a is routed from the floating pulley 220a back to the fixed pulley 225a. The force amplification fiber 230a can be wrapped around each of the fixed pulleys 225a and the floating pulleys 220a in this manner. The force amplification fiber 230a is routed from the fixed pulley 225a to a bobbin 245a. The bobbin 245a can be coupled to a motor (not shown), and actuation of the motor can actuate the first pulley set 215a.

The force amplifier 210 includes a second pulley set 215b substantially the same as the first pulley set 215a, however, in the embodiment of FIG. 2, the first pulley set 215a is nested within the second pulley set 215b. The second pulley set 215b includes a plurality of fixed pulleys 225b positioned proximal to the plurality of fixed pulleys 225a of the first pulley set 215a. A plurality of floating pulleys 220b are positioned proximal to the floating pulleys 220a of the first pulley set 215a. The first pulley set 215a and the second pulley set 215b are configured such that they do not interfere with each other (e.g., the force amplification fiber 230a does not contact force amplification fiber 230b). The distance between the floating pulleys 220b and the fixed pulleys 225b is greater than the distance between the floating pulleys 220a and the fixed pulleys 225a.

Additionally, the floating pulleys 220b and the fixed pulleys 225b have a diameter greater than the diameter of the floating pulleys 220a and the fixed pulleys 225a. The fixed pulleys 225b and the floating pulleys 220b are coupled by the force amplification fiber 230b, and the force amplification fiber 230b is coupled to a bobbin 245b. The bobbin 245b may be coupled to a motor (not shown), and actuation of the motor can actuate the second pulley set 215b. The nesting of the first pulley set 215a and the second pulley set 215b allows for a compact system that can be easily maintained and/or replaced.

Although not shown in FIG. 2, like the force amplifier 110, the force amplifier 210 can be coupled to one or more output fibers, and the output fibers can be coupled to an output pulley as described above in relation to FIGS. 1A-1B. The force amplifier 210 shown in FIG. 2 allows the entire force amplifier 210, and additionally the bobbins 145, to be easily replaced. Additionally, the force amplifier 210 may operate in parallel with other force amplifiers. For example, another force amplifier 210 can be positioned on top of and/or below the force amplifier 210, to maintain a compact configuration. In some embodiments, an array of force amplifiers can use control cables to drive the output. This configuration may be particularly useful for smaller robotic systems, such as finger tendons in a robotic arm.

The force amplifier 210 can be included in the power transmission drive 100 described above. Alternatively, the force amplifier 210 may be included in any other suitable power transmission drive 100. The force amplifier 210 may be used in a robotic system, such as a robotic arm, a human wearable exoskeleton for industrial, military, and consumer applications, robotic legs, or spider leg system. In other embodiments, the force amplifier 210 may be used in any suitable application (e.g., mechanical systems) where the mass or center of gravity location is controlled.

In some embodiments (not shown), the power transmission drive may include three or more pulley sets arranged around an output pulley shaped like a ball joint. This configuration provides at least three axes along which power can be transmitted allowing for systems with a greater range of motion and configurable power transmission along the greater range of motion without the need for complex and heavy gear trains. In this embodiment, the pulley sets may compactly provide more degrees of freedom and function similar to a shoulder, a wrist, a knee joint, etc.

The power transmission drive 100 described above is lightweight, robust, and compact such that the power transmission drive 100 can be included in a variety of applications. In particular, the components of the power transmission drive 100, such as the force amplifier 110 or the force amplifier 210, are well suited to robotic applications. For example, the force amplifier (e.g., 110, 210) may be commutable such that it can be easily replaced in a system. Additionally, the tension-based configuration of components of the power transmission drive 100 allows the one or more motors to provide relatively high input speeds with minimal inertia and backlash on the system components. As such, components of the power transmission drive 100 may have an increased life span and improved performance compared to traditional power transmission drives.

The power transmission drive 100 increases power output of one or more motors while minimizing weight and load on system components. The high efficiency of the power transmission drive 100 is achieved through rolling contact on all force bearing surfaces. The power transmission drive 100 may provide high precision, backlash-free position control of the output even when low tolerance components are used in the design of the power transmission drive 100 due to the antagonistic architecture correcting for the looseness of any component. Additionally, a separate control loop may run on each antagonistic pair (e.g., a motor and pulley set) and the output component to attain the necessary bandwidth for the desired level of position control. The power transmission drive 100 may increase the overall stiffness by applying a bias offset tension from the antagonistic pair.

Robotic Arm Embodiments

Figure 3A:
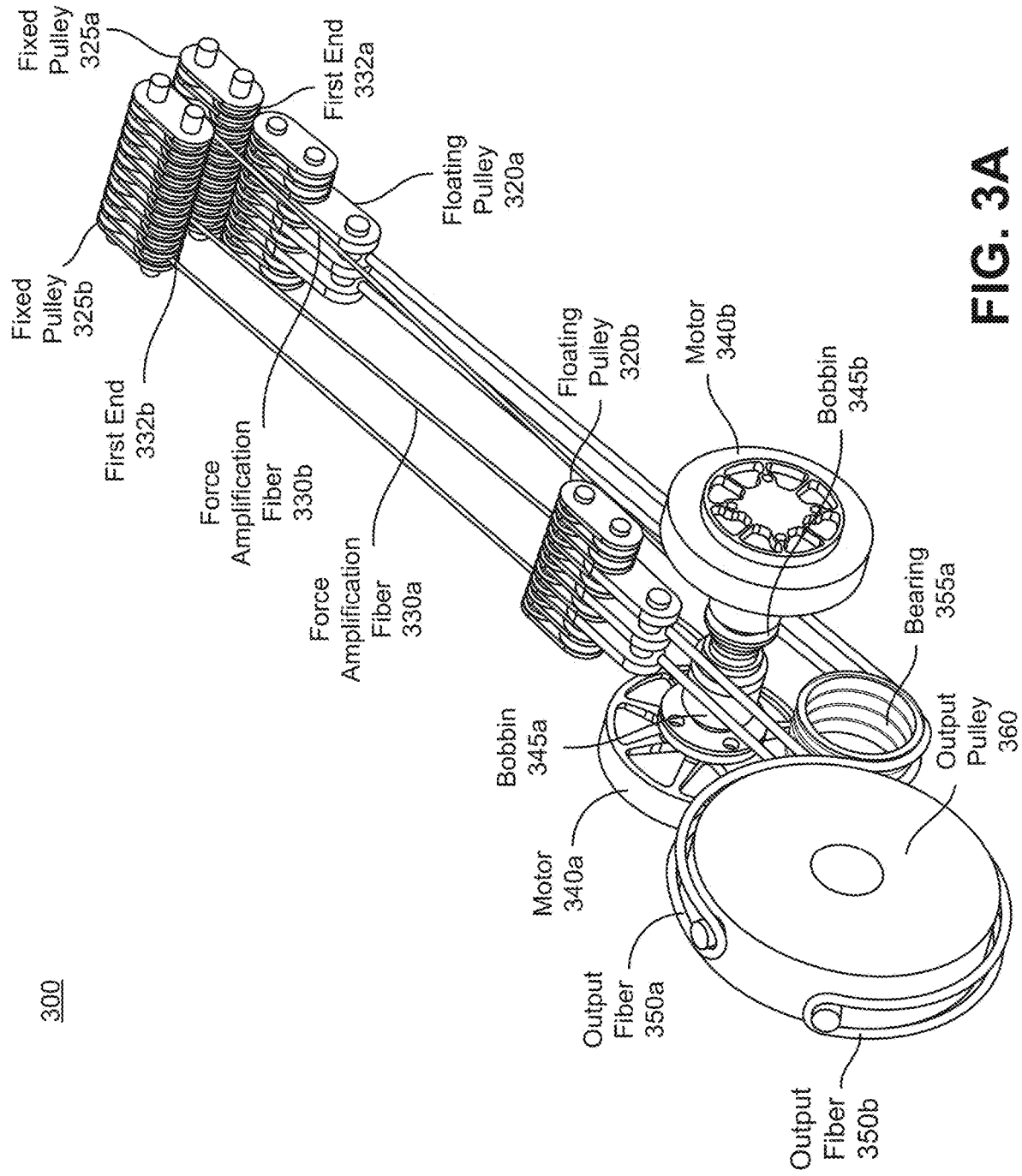
FIG. 3A illustrates an isometric view of an example power transmission drive for use in a robotic arm, in accordance with one or more embodiments.
Figure 3B:
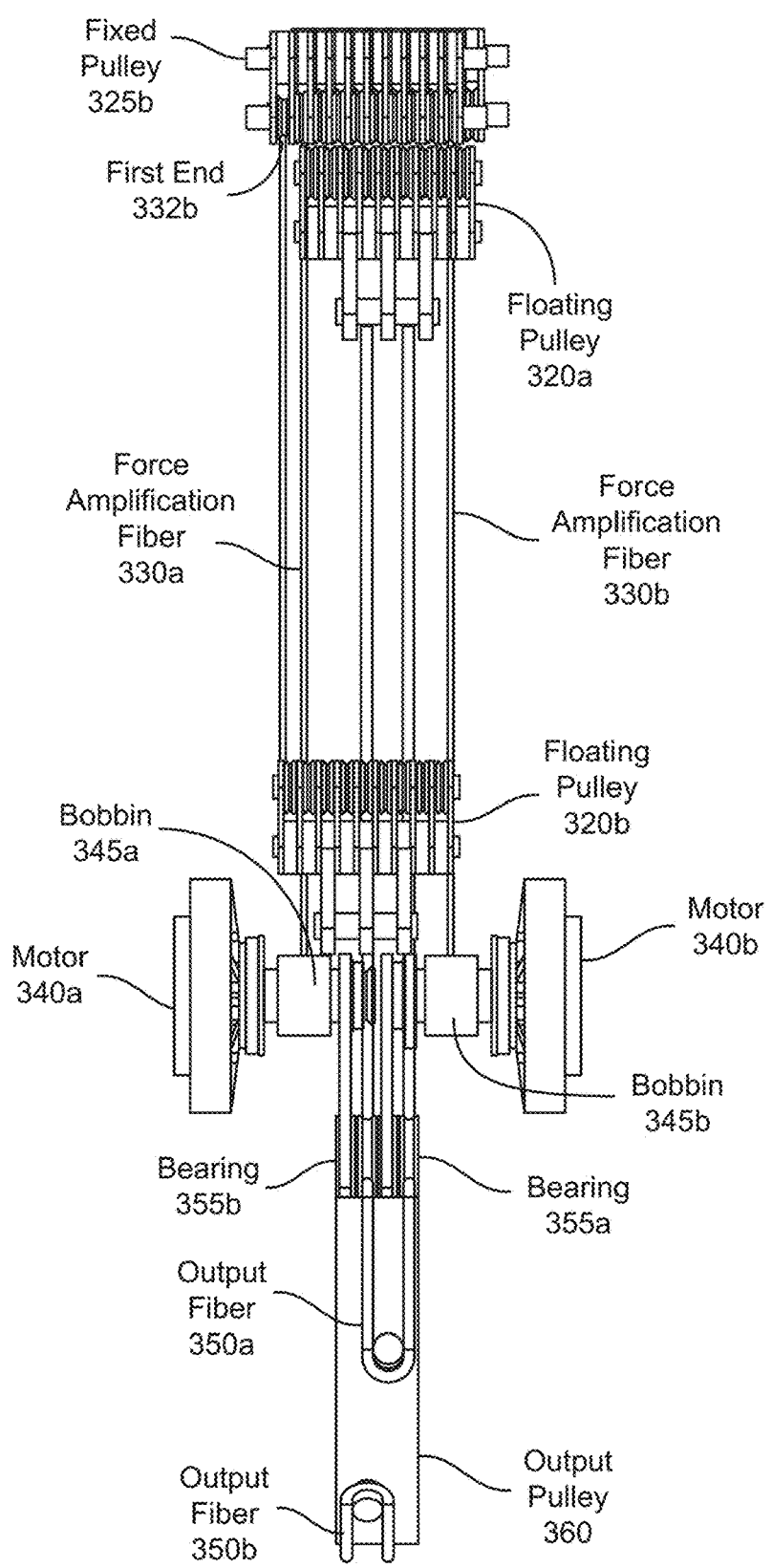
FIG. 3B illustrates a top-down view of the example power transmission drive shown in FIG. 3A.
Figure 3C:
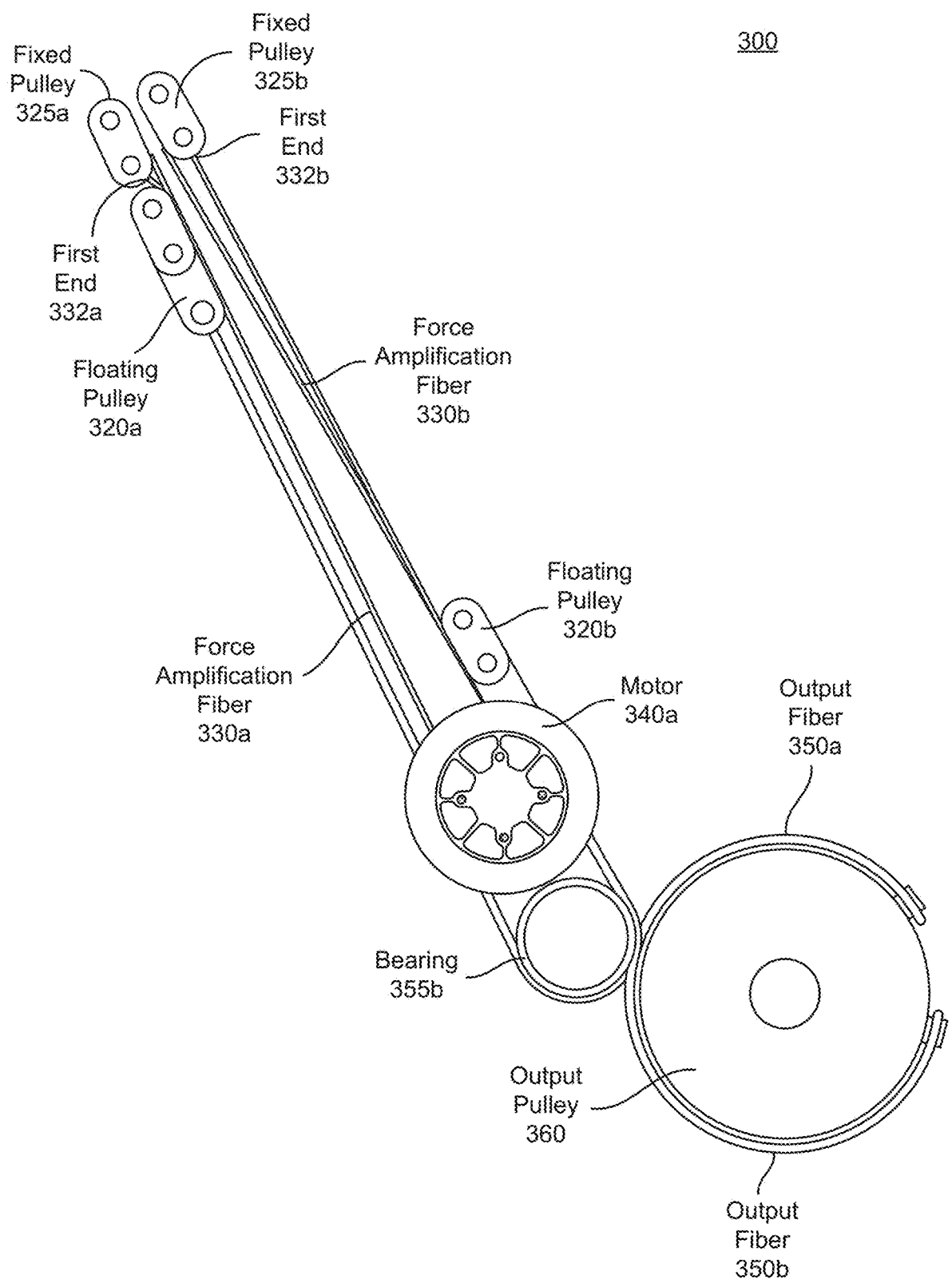
FIG. 3C illustrates a side view of the example power transmission drive shown in FIG. 3A.

FIG. 3A illustrates an isometric view of an example power transmission drive 300 for use in a robotic arm, in accordance with one or more embodiments. FIG. 3B illustrates a top-down view of the example power transmission drive 300 shown in FIG. 3A. FIG. 3C illustrates a side view of the example power transmission drive 300 shown in FIG. 3A.

In FIGS. 3A-3C, the power transmission drive 300 is substantially similar to the power transmission drive 100 illustrated in FIGS. 1A-1B. The example power transmission drive 300 includes at least one or more fixed pulleys 325, one or more floating pulleys 320, one or more motors 340, one or more bobbins 345, one or more output fibers 350, one or more bearings 355, and at least one output pulley 360. In other embodiments, the power transmission drive 300 includes fewer or greater components than described herein. Additionally, the functions of the components may be distributed in a different manner than described below.

The embodiment illustrated in FIGS. 3A-3C includes a force amplifier embodiment similar to the force amplifier 210 illustrated in FIG. 2. Similar to force amplifier 210, a first pulley set of the power transmission drive 300 includes a fixed pulley 325a and a floating pulley 320a and a second pulley set of the power transmission drive 300 includes a fixed pulley 325b and a floating pulley 320b. As shown in FIGS. 3A-3C, the first pulley set includes a plurality of fixed pulleys 325a and a plurality of floating pulleys 320a and the second pulley set includes a plurality of fixed pulleys 325b and a plurality of floating pulleys 320b. Each of the plurality of pulleys (fixed pulleys 225a and floating pulleys 220a) are stacked along the same axis, so that the pulleys are compact. The fixed pulleys 325a and the floating pulleys 320a are substantially the same size and shape (e.g., they have the same diameter). In alternative embodiments, the fixed pulleys 325a and the floating pulleys 320a can have different shapes and/or sizes.

The force amplification fiber 330a is configured to wrap around the fixed pulleys 325a and the floating pulleys 320a. In one embodiment, a first end of the force amplification fiber 330a is coupled to a fixed pulley 325a such that the force amplification fiber 330a is fixed at the first end 332a. The force amplification fiber 330a is routed from the fixed end to wrap around a floating pulley 320a. The force amplification fiber 330a is routed from the floating pulley 320a back to the fixed pulley 325a. The force amplification fiber 330a can be wrapped around each of the fixed pulleys 325a and the floating pulleys 320a in this manner. The force amplification fiber 330a is routed from the fixed pulley 325a to a bobbin 345a. The bobbin 345a can be coupled to a motor 340a, and actuation of the motor can actuate the first pulley set.

The second pulley set is substantially the same as the first pulley set. The second pulley set includes a plurality of fixed pulleys 325b positioned proximal to the plurality of fixed pulleys 325a of the first pulley set. The first pulley set and the second pulley set are configured such that they do not interfere with each other (e.g., the force amplification fiber 330a does not contact force amplification fiber 330b). The distance between the floating pulleys 320b and the fixed pulleys 325b is greater than the distance between the floating pulleys 320a and the fixed pulleys 325a. The fixed pulleys 325b and the floating pulleys 320b are coupled by the force amplification fiber 330b, and the force amplification fiber 330b is coupled to a bobbin 345b. The bobbin 345b may be coupled to a motor 340b, and actuation of the motor can actuate the second pulley set.

In the embodiment of FIGS. 3A-3C, the first pulley set is driven by a motor 340a coupled to a bobbin 345a. As described above, the force amplification fiber 330a is routed from the fixed pulley 325a to the bobbin 345a. The force amplification fiber 330a wraps around the bobbin 345a, and the motor 340a actuates rotation of the bobbin 345a. Rotation of the bobbin 345a causes translation of the floating pulley 320a towards the fixed pulley 325a or away from the fixed pulley 325a.

The first pulley set is coupled to an output fiber 350a configured to interact with an output component. In some embodiments, the output fiber 350a is configured to translate with the floating pulley 320a, as described above. In one embodiment, the floating pulley 320a is coupled to the output fiber 350a, and the output fiber 350a is routed to an output pulley 360 by a bearing 355a. The output fiber 350a applies a torque to the output pulley 360. The bearing 355a is configured to constrain motion of the output fiber 350a relative to the output pulley 360.

Figure 3D:
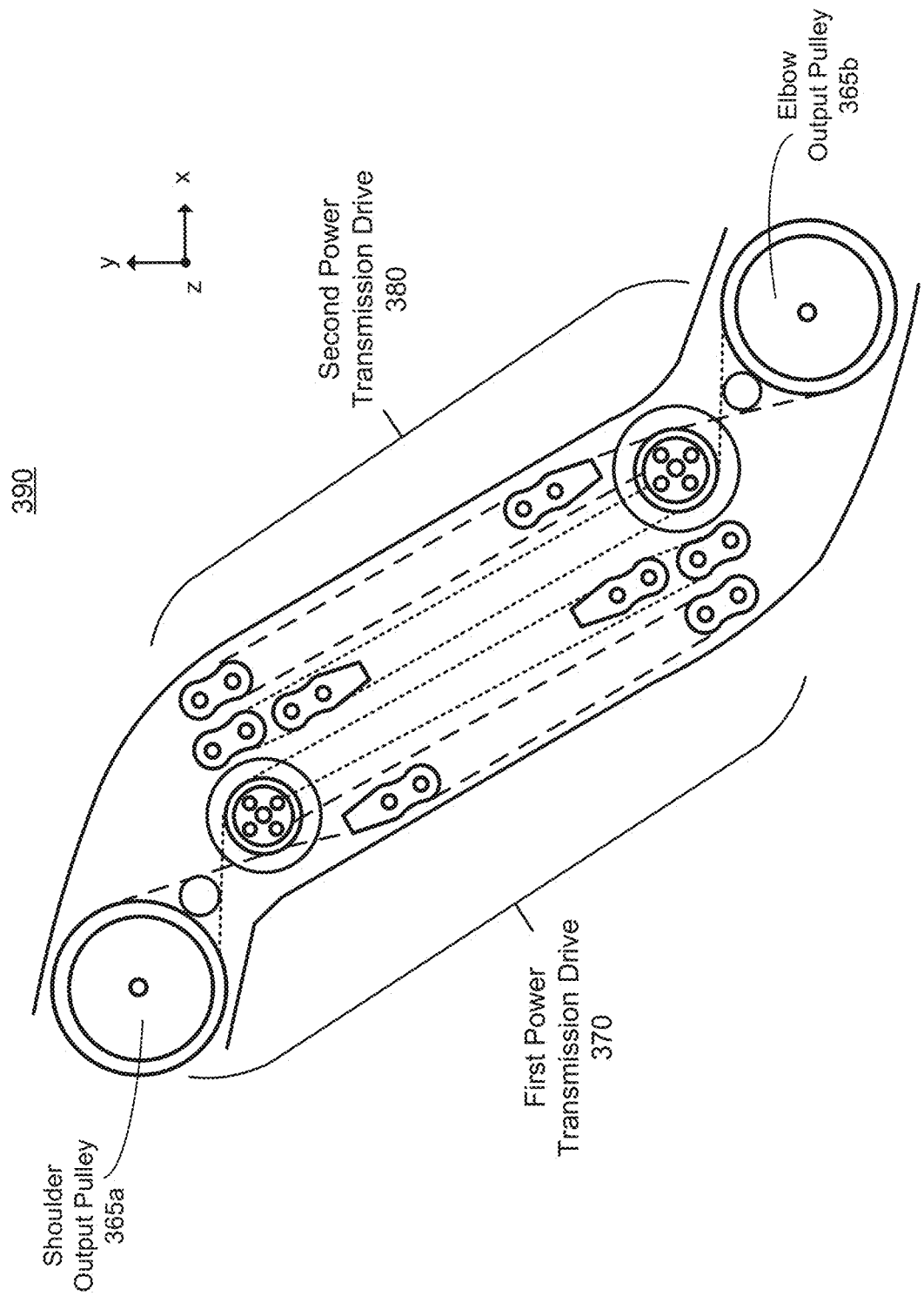
FIG. 3D illustrates an example embodiment of two example power transmission drives for use in a robotic arm, in accordance with one or more embodiments.

FIG. 3D illustrates an example embodiment of two power transmission drives 370, 380 for use in a robotic arm 390, in accordance with one or more embodiments. Each of the power transmission drives, a first power transmission drive 370 and a second power transmission drive 380, are substantially similar to the power transmission drive 100 and the power transmission drive 300 illustrated in FIGS. 1A-1B and 3A-3C.

In the embodiment of FIG. 3D, the first power transmission drive 370 includes a shoulder output pulley 365a and the second power transmission driver 380 includes an elbow output pulley 365b. In one embodiment (not shown), there may be more than one shoulder output pulley that controls the movement of the shoulder of the robotic arm 390. In this embodiment, more than one power transmission drive similar to the first power transmission drive 370 may be stacked next to each other along an axis parallel to the z-axis within the robotic arm 390. In some embodiments, there may be more than one elbow output pulley that controls the movement of the elbow of the robotic arm. In this embodiment, more than one power transmission drive similar to the second power transmission drive 380 will be stacked next to each other along an axis parallel to the z-axis within the robotic arm 390. In another example (not shown), the output pulley of the first transmission drive 370 may be an elbow output pulley and the output pulley of the second transmission drive 380 may be a wrist output pulley.

The first power transmission drive 370 adjusts the torque or speed output at the shoulder output pulley 365a based on the input power supplied by the one or more motors of the first power transmission drive 370. In one example, the first power transmission drive 370 increases the torque at the shoulder output pulley 365a allowing the robotic arm 390 to more easily lift an object. In another example, the first power transmission drive 370 increases the speed at the shoulder output pulley 365a allowing the robotic arm 390 to quickly return to a resting position. The second power transmission drive 380 adjusts the torque or speed output at the elbow output pulley 365b based on the input power supplied by the one or more motors of the second power transmission drive 380. In one example, the second power transmission drive 380 increases the torque at the elbow output pulley 365b allowing the robotic arm 390 to more easily push down an object. In another example, the second power transmission drive 380 increases the speed at the elbow output pulley 365b allowing the robotic arm 390 to quickly bend at the elbow.

Alternative Power Transmission Drive Configuration

Figure 4A:
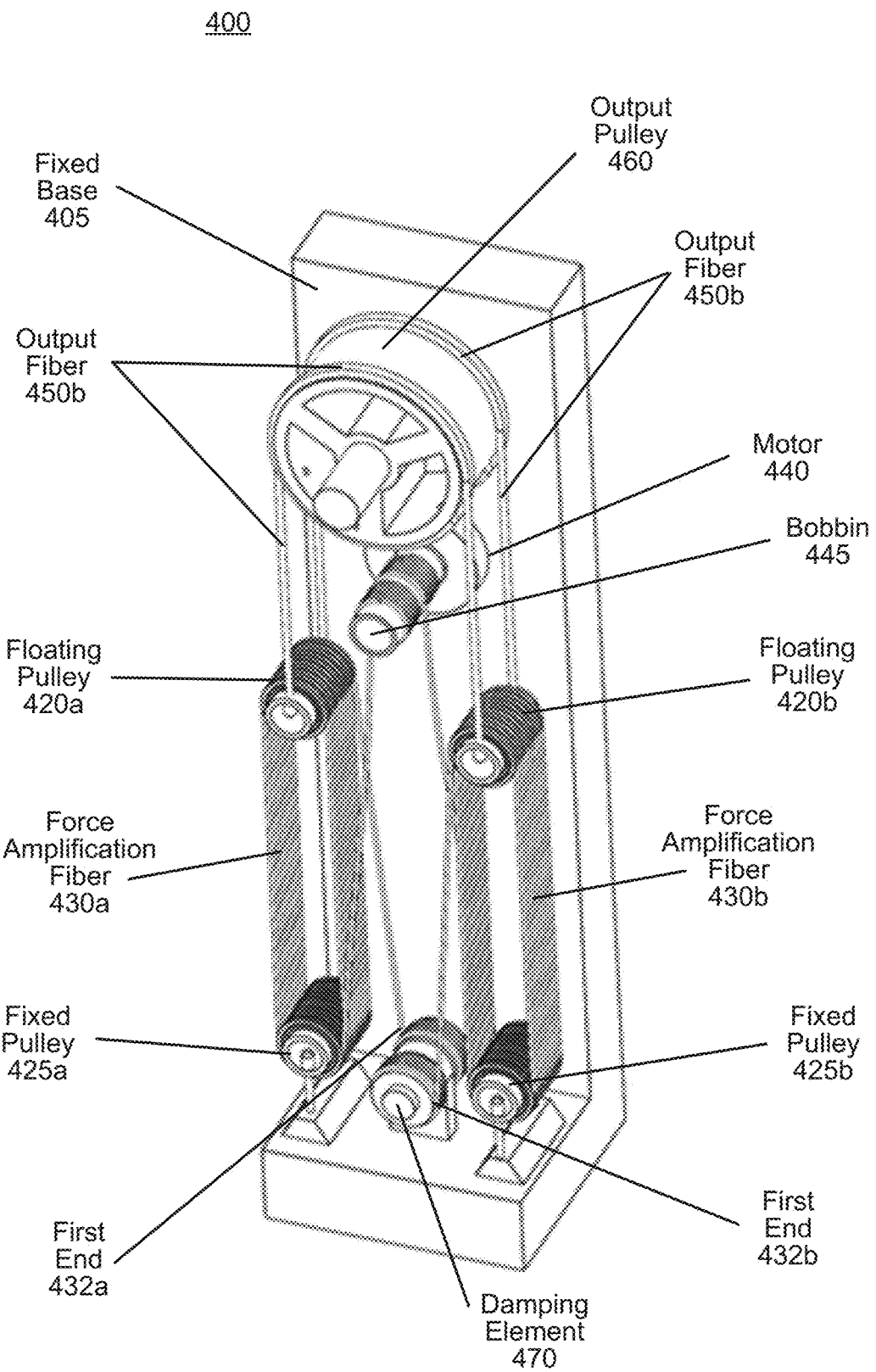
FIG. 4A is an isometric view of an alternative example power transmission drive, in accordance with one or more embodiments.
Figure 4B:
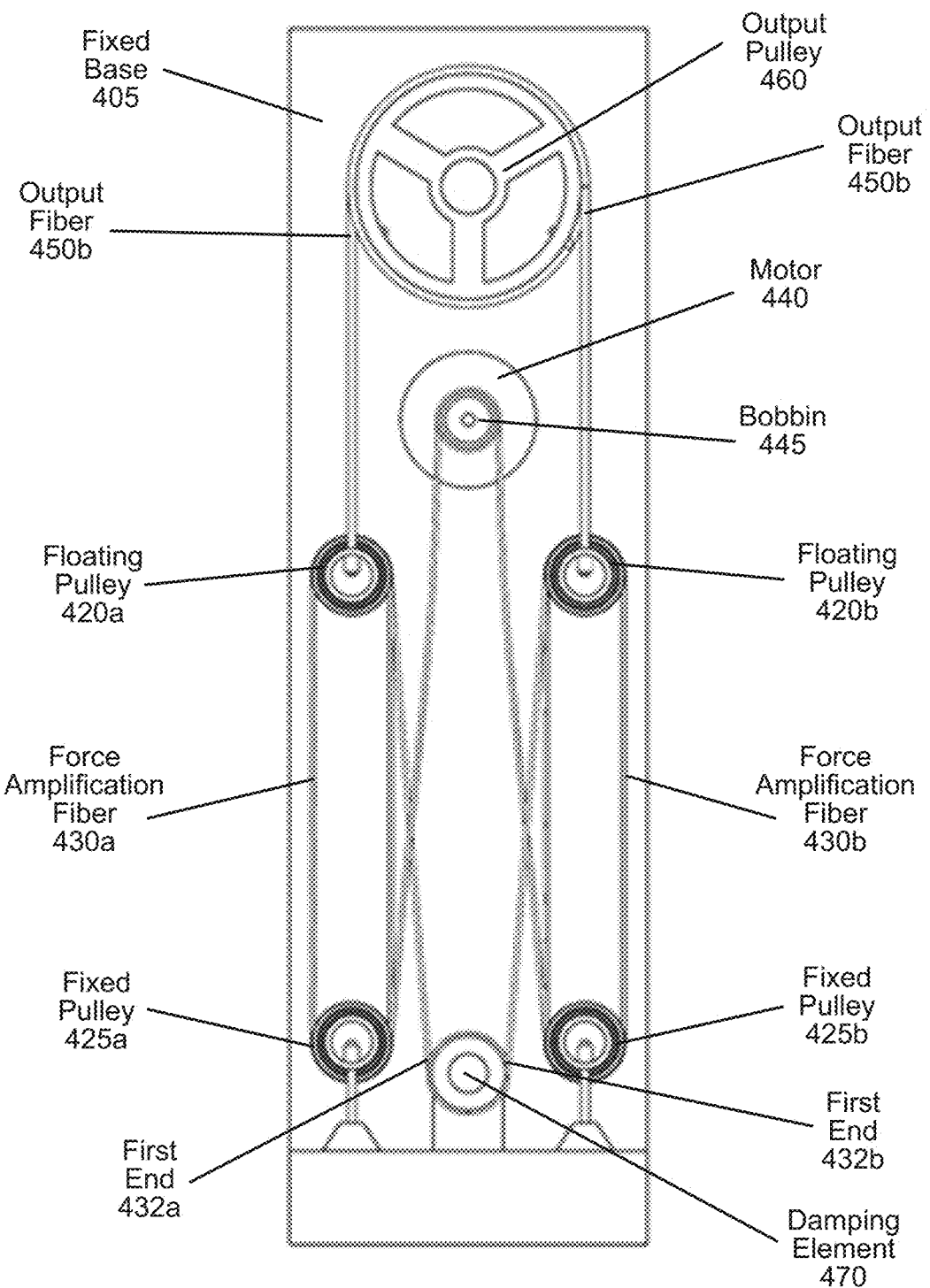
FIG. 4B is a side view of the alternative example power transmission drive shown in FIG. 4A.

FIG. 4A illustrates an isometric view of an alternative example power transmission drive 400, in accordance with one or more embodiments. FIG. 4B illustrates a side view of the alternative example power transmission drive 400 shown in FIG. 4A. In FIGS. 4A-4B, the power transmission drive 400 is substantially similar to the power transmission drive 100 illustrated in FIGS. 1A-1B and the power transmission drive 300 illustrated in FIGS. 3A-3C. The example power transmission drive 400 includes at least one or more fixed pulleys 425, one or more floating pulleys 420, one or more output fibers 450, and at least one output pulley 460. Additionally, the power transmission drive 400 includes a fixed base 405, one motor 440, one bobbin 445, and a damping element 470. In other embodiments, the power transmission drive 400 includes fewer or greater components than described herein. Additionally, the functions of the components may be distributed in a different manner than described below.

The embodiment illustrated in FIGS. 4A-4B includes a force amplifier embodiment similar to the force amplifier 110 illustrated in FIGS. 1A-1B. Similar to force amplifier 110, a first pulley set of the power transmission drive 400 includes a fixed pulley 425a and a floating pulley 420a and a second pulley set of the power transmission drive 400 includes a fixed pulley 425b and a floating pulley 420b. In the illustrated embodiment, the fixed pulleys 425 are coupled to the fixed base 405. In some embodiments, the fixed base 405 can include a control system (not shown) that controls the actuation of the motor 440. In some embodiments, the control system may further control the damping element 470 as described below in more detail. As shown in FIGS. 4A-4B, the first pulley set includes a plurality of fixed pulleys 425a and a plurality of floating pulleys 420a and the second pulley set includes a plurality of fixed pulleys 425b and a plurality of floating pulleys 420b. Each of the plurality of pulleys (fixed pulleys 425 and floating pulleys 420) are stacked along the same axis, so that the pulleys are compact. The fixed pulleys 425 and the floating pulleys 420 are substantially the same size and shape (e.g., they have the same diameter). In alternative embodiments, the fixed pulleys 425 and the floating pulleys 420 can have different shapes and/or sizes.

In the first pulley set, the force amplification fiber 430a is configured to wrap around the fixed pulleys 425a and the floating pulleys 420a. In one embodiment, a first end of the force amplification fiber 430a is coupled to a damping element 470 such that the force amplification fiber 430a is fixed at the first end 432a. The force amplification fiber 430a is routed from the fixed end to wrap around a floating pulley 420a. The force amplification fiber 430a is routed from the floating pulley 420a back to the fixed pulley 425a. The force amplification fiber 430a is wrapped around the floating pulley 420a and the fixed pulley 425a in an alternating fashion one or more times as needed in order to achieve the desired degree of force amplification. The force amplification fiber 430a wraps around the fixed pulley 425a and is routed from the fixed pulley 425a to the bobbin 445, and the bobbin 445 is coupled to the motor 440. Actuation of the motor 440 can actuate the first pulley set.

In some embodiments, the damping element 470 may provide dynamic tension to the force amplification fiber 430a. Dynamic tension provides for calibration of a resting position of the pulley set, for electronic control of joint stiffness, and for high friction for stopping (or braking) the power transmission drive 400. In alternative embodiments, the damping element 470 may provide static tension to the force amplification fiber 430a. Static tension provides a means of setting a desired joint stiffness and compensates for backlash. In some embodiments, the tension settings may be based on received instructions from the control system (not shown). In some embodiments, the control system provides instructions to a second motor (not shown) that controls the tension provided by the damping element 470. The second motor may be smaller than the motor 440 providing for a more compact design of the power transmission drive 400. In one embodiment, the control system may be an internal component (e.g., integrated on the fixed base 405) included in the power transmission drive 400 system. In some embodiments, the control system may be an external component connected via a wired or wireless connection to the power transmission drive 400. The control system may receive tension measurements from one or more sensors (not shown) of the power transmission drive 400. For example, a sensor may measure tension of the force amplification fiber 430a at the first end 432a. In another example, a sensor may measure tension of the output fiber 450a. Based on the received tension measurements, the control system provides instructions corresponding to tension settings accordingly.

The second pulley set is substantially the same as the first pulley set. The first pulley set and the second pulley set are configured such that they do not interfere with each other (e.g., the force amplification fiber 430a does not contact force amplification fiber 430b). The force amplification fiber 430b is coupled to the damping element 470 such that the force amplification fiber 430b is fixed at the first end 432b. The fixed pulleys 425b and the floating pulleys 420b are coupled by the force amplification fiber 430b in a similar manner as the first pulley set, and the force amplification fiber 430b is coupled to the bobbin 445. The bobbin 445 may be coupled to the motor 440, and actuation of the motor 440 can actuate the second pulley set.

In the embodiment of FIGS. 4A-4B, the first pulley set and the second pulley set are driven by the motor 440 coupled to the bobbin 445. As described above, the force amplification fibers 430 are routed from the fixed pulleys 425 to the bobbin 445. The force amplification fibers 430 wrap around the bobbin 445, and the motor 440 actuates rotation of the bobbin 445. Rotation of the bobbin 345 causes translation of the floating pulleys 420 towards the fixed pulleys 425 or away from the fixed pulleys 425. Thus, the bobbin 445 converts the motor 440 torque to tension in the force amplification fibers 430.

The first pulley set is coupled to an output fiber 450a configured to interact with an output component. In some embodiments, the output fiber 450a is configured to translate with the floating pulley 420a, as described above. In one embodiment, the floating pulley 420a is coupled to the output fiber 450a, and the output fiber 450a is routed to an output pulley 460. During translation of the floating pulley 420a, the output fiber 450a wraps around the output pulley 460. The output fiber 450a applies a torque to the output pulley 460. The second pulley set is coupled to an output fiber 450b and configured to operate in a similar manner to the first pulley set.

The power transmission drive 400 provides a simpler and less expensive design with fewer motors. For example, in an embodiment where a robotic arm needs six degree of motion, six power transmission drives 400 may be used to provide the necessary motion by using a control system that provides actuation instructions to six motors as opposed to 12 motors. The power transmission drive 400 also provides for better control of stiffness and tension by utilizing the damping element 470. Different modes of operation are made possible in near real-time. For example, the damping element 470 may adjust the tension accordingly to allow for the power transmission drive 400 to have low stiffness, precision, and speed for one mode operation and high stiffness, precision, and speed for another mode of operation.

Additional Configuration Information

The power transmission drive described herein operates in tension rather than friction to amplify the force of one or more motors. This allows the one or more motors to provide relatively high input speeds with minimal inertia and backlash on the power transmission drive system components. Additionally, the rolling contact between the pulleys and the force amplification fiber of the power transmission drive allows for improved efficiency of the drive. The power transmission drive is lightweight, robust, and compact such that the power transmission drive is well suited to robotic applications.

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a force amplifier comprising:
      a first pulley set and a second pulley set, each pulley set comprising at least one fixed pulley and at least one floating pulley,
      a first force amplification fiber in tension that couples the at least one fixed pulley to the at least one floating pulley of the first pulley set, and
      a second force amplification fiber in tension that couples the at least one fixed pulley to the at least one floating pulley of the second pulley set;
   a motor assembly comprising:
      a first motor coupled to the first force amplification fiber of the first pulley set, and
      a second motor coupled to the second force amplification fiber of the second pulley set;
   a first output fiber coupled to the at least one floating pulley of the first pulley set; and
   a second output fiber coupled to the at least one floating pulley of the second pulley set.

2. The system of claim 1, wherein the at least one fixed pulley and the at least one floating pulley of the first pulley set are aligned along a first axis, and the at least one fixed pulley and the at least one floating pulley of the second pulley set are aligned along a second axis, the first axis parallel to the second axis.

3. The system of claim 2, wherein the at least one floating pulley of the first pulley set translates in a positive and a negative direction along the first axis, and the at least one floating pulley of the second pulley set translates in a positive and a negative direction along the second axis.

4. The system of claim 2, wherein the at least one floating pulley of the first pulley set translates in a positive and a negative direction along a third axis, the third axis is orthogonal to the first axis, and the at least one floating pulley of the second pulley set translates in a positive and a negative direction along a fourth axis, the fourth axis is orthogonal to the second axis.

5. The system of claim 1, further comprising:
an output pulley coupled to the first output fiber and the second output fiber by at least a bearing.

6. The system of claim 5, wherein the output pulley is a cam.

7. The system of claim 1, wherein the first motor is coupled to the first force amplification fiber of the first pulley set by a first bobbin, and the second motor is coupled to the second force amplification fiber of the second pulley set by a second bobbin.

8. The system of claim 1, wherein the first pulley set and the second pulley set are an antagonistic pair.

9. The system of claim 1, wherein at least one of: the first force amplification fiber or the second force amplification fiber is composed of an ultra-high molecular weight polyethylene material.

10. The system of claim 1, wherein a first end of the first force amplification fiber of the first pulley set is fixed to the at least one fixed pulley of the first pulley set, and a first end of the second force amplification fiber of the second pulley set is fixed to the at least one fixed pulley of the second pulley set.

11. The system of claim 1, wherein the first force amplification fiber wraps around the at least one floating pulley and alternately around the at least one fixed pulley of the first pulley set at least one time, and the second force amplification fiber wraps around the at least one floating pulley and alternately around the at least one fixed pulley of the second pulley set at least one time.

12. The system of claim 1, wherein the at least one floating pulley and the at least one fixed pulley of the first pulley set and the second pulley set have substantially the same diameter.

13. The system of claim 1, wherein the first pulley set is nested within the second pulley set.

14. The system of claim 13, wherein a diameter of the floating pulley of the first pulley set is smaller than a diameter of the floating pulley of the second pulley set.

15. The system of claim 1, wherein the system is coupled within a robotic arm.

16. The system of claim 1, wherein a first end of the first force amplification fiber of the first pulley set is fixed to a damping element, and a first end of the second force amplification fiber of the second pulley set is fixed to the damping element.

17. The system of claim 1, further comprising:
the force amplifier further comprising:
one or more additional pulley sets, each additional pulley set comprises at least one fixed pulley and at least one floating pulley, the at least one fixed pulley is coupled to the at least one floating pulley by a force amplification fiber in tension; and
the motor assembly further comprising:
one or more additional motors, each additional motor coupled to the force amplification fiber of one of the additional pulley sets.

18. The system of claim 17, further comprising:
an output pulley coupled to the first pulley set by the first output fiber and the second pulley set by the second output fiber, wherein each individual pulley set is positioned around the output pulley, the positioning of the pulley sets circumscribes the output pulley.

19. A system comprising:
a force amplifier comprising:
a first pulley set and a second pulley set, each pulley set comprising at least one fixed pulley and at least one floating pulley,
a first force amplification fiber in tension that couples the at least one fixed pulley to the at least one floating pulley of the first pulley set, and
a second force amplification fiber in tension that couples the at least one fixed pulley to the at least one floating pulley of the second pulley set;
a motor assembly comprising:
a motor coupled to the first force amplification fiber of the first pulley set and the second force amplification fiber of the second pulley set;
a first output fiber coupled to the at least one floating pulley of the first pulley set; and
a second output fiber coupled to the at least one floating pulley of the second pulley set.

20. The system of claim 19, wherein a first end of the first force amplification fiber of the first pulley set is fixed to a damping element, and a first end of the second force amplification fiber of the second pulley set is fixed to the damping element.

* * * * *